US012570171B2

(12) United States Patent
Lee et al.

(10) Patent No.: US 12,570,171 B2
(45) Date of Patent: Mar. 10, 2026

(54) ELECTRIFIED VEHICLE AND METHOD OF CONTROLLING SAME

(71) Applicants: Hyundai Motor Company, Seoul (KR); Kia Corporation, Seoul (KR)

(72) Inventors: Yong Jae Lee, Yongin-si (KR); Young Kwan Ko, Seoul (KR); Byung Kwan Son, Hwaseong-si (KR); Jang Yoon Jeong, Hwaseong-si (KR); Ho Tae Chun, Seoul (KR); Yoo Jong Lee, Osan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 147 days.

(21) Appl. No.: 18/389,289

(22) Filed: Nov. 14, 2023

(65) Prior Publication Data

US 2024/0424930 A1 Dec. 26, 2024

(30) Foreign Application Priority Data

Jun. 20, 2023 (KR) ........................ 10-2023-0079108

(51) Int. Cl.
*B60L 53/24* (2019.01)
*B60L 15/22* (2006.01)

(52) U.S. Cl.
CPC .............. *B60L 53/24* (2019.02); *B60L 15/22* (2013.01); *B60L 2210/40* (2013.01); *B60L 2260/26* (2013.01)

(58) Field of Classification Search
CPC ...... B60L 53/24; B60L 15/22; B60L 2210/40; B60L 2260/26; B60L 2240/421
See application file for complete search history.

(56) References Cited

U.S. PATENT DOCUMENTS 5,650,707 A * 7/1997 Lipo ...................... H02K 17/14
318/773
7,154,237 B2 * 12/2006 Welchko ................. B60L 50/51
318/400.27

(Continued)

FOREIGN PATENT DOCUMENTS

JP 2018102070 A * 6/2018 .............. H02M 7/48
JP 6426002 B2 11/2018

(Continued)

OTHER PUBLICATIONS

European Search Report issued on May 7, 2024 in corresponding European patent application No. 23210902.5.

*Primary Examiner* — Thai T Dinh
(74) *Attorney, Agent, or Firm* — Morgan, Lewis & Bockius LLP

(57) ABSTRACT

An electrified vehicle may include: a main battery and an auxiliary battery; a motor system including a dual inverter connected to the main battery and driving a motor depending on a motor driving mode, and a transfer switch for switching between first and second driving modes included in the motor driving mode; and a charging switch connected between the motor system and the auxiliary battery, and configured to form a boost charging path connected from the auxiliary battery to the main battery through the motor system when the first driving mode switches to a charging mode while driving.

20 Claims, 10 Drawing Sheets

(56)          References Cited

U.S. PATENT DOCUMENTS

| | | | | |
|---|---|---|---|---|
| 7,199,535 B2 * | 4/2007 | Welchko | ............... | B60L 15/025 |
| | | | | 318/105 |
| 2009/0033253 A1 * | 2/2009 | Nagashima | ............ | B60L 15/00 |
| | | | | 320/137 |
| 2023/0179086 A1 * | 6/2023 | Jun | ....................... | H02M 1/385 |
| | | | | 363/71 |

FOREIGN PATENT DOCUMENTS

| | | | | | |
|---|---|---|---|---|---|
| JP | 6515858 | B2 | 5/2019 | | |
| JP | 6701722 | B2 | 5/2020 | | |
| JP | 7338071 | B2 * | 9/2023 | ............. | H02P 25/18 |
| KR | 10-2019-0119778 | A | 10/2019 | | |
| KR | 10-2024-0092676 | A | 6/2024 | | |
| WO | 201/4068900 | A1 | 5/2014 | | |
| WO | WO-2018117084 | A1 * | 6/2018 | ............. | H02P 27/08 |
| WO | 2022/054181 | A1 | 3/2022 | | |

* cited by examiner

FIG. 7

ELECTRIFIED VEHICLE AND METHOD OF CONTROLLING SAME

CROSS-REFERENCE TO RELATED APPLICATION(S)

The present application is based on and claims the benefit of priority to Korean Patent Application No. 10-2023-0079108, filed on Jun. 20, 2023 in the Korean Intellectual Property Office, the disclosure of which is herein incorporated by reference in its entirety.

TECHNICAL FIELD

The present disclosure relates to an electrified vehicle that controls charging and discharging of a battery while driving and a method of controlling the same.

BACKGROUND

In line with the recent global trend of reducing carbon dioxide emissions, there is an increasing demand for electrified vehicles that generate driving power by driving a motor with electric energy stored in a battery, instead of typical internal combustion engine vehicles that generate driving power by burning fossil fuels.

In general, a coil in each phase included in a motor of an electrified vehicle has one end connected to one inverter and an opposite end connected thereto, thereby forming a Y-connection.

When the motor is driven, a switching element in the inverter is turned on/off by pulse width modulation control and applies a line-to-line voltage to the coil of the motor forming the Y-connection in order to generate an alternating current, thereby generating a torque.

The fuel efficiency (or electric efficiency) of an eco-friendly vehicle such as an electric vehicle that uses the torque generated by the above motor as power is determined by the power conversion efficiency of the inverter-motor, so it is important to maximize the power conversion efficiency of the inverter and the efficiency of the motor.

The efficiency of the inverter-motor system is mainly determined by a voltage utilization rate of the inverter. Therefore, when the driving point of the vehicle determined by the relationship between motor speed and torque is formed in the section having a high voltage utilization rate, the fuel efficiency of the vehicle may be improved.

However, as the number of coils of the motor increases to raise the maximum torque of the motor, the section with a high voltage utilization rate becomes farther away from a low torque region, which is the main driving point of the vehicle, so that the fuel efficiency of the vehicle may deteriorate. In addition, in terms of fuel efficiency, when the main driving point is designed to be included in the section having a high voltage utilization rate, the maximum torque of the motor may be limited, which may cause a problem in which the acceleration performance of the vehicle is lowered.

In this field of technology, since there is a demand for motor driving technology capable of improving system efficiency while covering both low and high power sections by one motor, a technology of driving one motor in two different modes using two inverters and a mode transfer switch has been recently introduced.

The information disclosed in the background section above is to aid in the understanding of the background of the present disclosure and should not be regarded as acknowledgement that this information forms any part of prior art.

SUMMARY OF THE DISCLOSURE

Various aspects of the present disclosure are directed to an electrified vehicle that can efficiently improve the mileage of the electrified vehicle by charging a main battery by boosting the voltage of an auxiliary battery through a motor system while driving.

The technical subjects pursued in the present disclosure may not be limited to the above-mentioned technical subjects, and other technical subjects which are not mentioned may be clearly understood, through the following descriptions, by those skilled in the art to which the present disclosure pertains.

As an exemplary embodiment of the present disclosure, an electrified vehicle may include: a main battery and an auxiliary battery; a motor system including a dual inverter connected to the main battery and driving a motor depending on a motor driving mode, and a transfer switch for switching between first and second driving modes included in the motor driving mode; and a charging switch connected between the motor system and the auxiliary battery, and configured to form a boost charging path connected from the auxiliary battery to the main battery through the motor system when the first driving mode switches to a charging mode while driving.

In addition, as another exemplary embodiment of the present disclosure, an electrified vehicle may include: a main battery and an auxiliary battery; a motor system configured to drive a motor through an inverter connected to the main battery; and a controller configured to perform, when a charging mode while driving is performed, a preconfigured pulse width modulation control on the inverter to control a DC offset for a phase current of the motor such that the motor system boosts the voltage of the auxiliary battery to charge the main battery.

In addition, as still another exemplary embodiment of the present disclosure, a method of controlling an electrified vehicle may include: driving a motor through an inverter based on a voltage of a main battery in a motor system; and forming a boost charging path connected from an auxiliary battery to the main battery through the motor system when a charging mode while driving is performed in a state in which the motor is driven.

According to various exemplary embodiments of the present disclosure, it is possible to efficiently improve the mileage of an electrified vehicle by charging a main battery by boosting the voltage of an auxiliary battery through a motor system while driving.

Advantageous effects obtainable from the present disclosure may not be limited to the above-mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which:

FIG. 7 is a circuit diagram of a motor driving device included in an electrified vehicle according to another exemplary embodiment of the present disclosure;

DETAILED DESCRIPTION OF THE EXEMPLARY EMBODIMENTS

Figure 1:
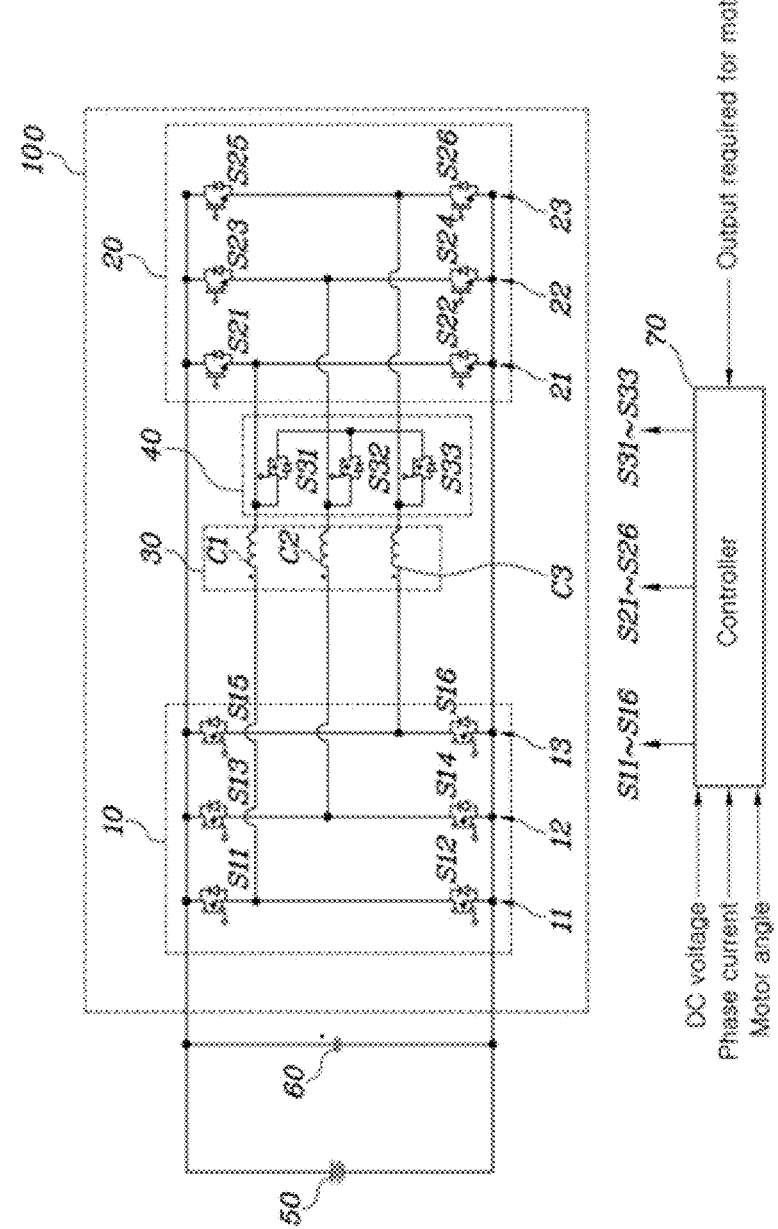
FIG. 1 is a circuit diagram illustrating an example of a motor driving device according to an exemplary embodiment of the present disclosure.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments disclosed in the present specification will be described in detail with reference to the accompanying drawings, and the same or similar elements are given the same and similar reference numerals, so duplicate descriptions thereof will be omitted. The terms "module" and "unit" used for the elements in the following description are given or interchangeably in used consideration of only the ease of writing the specification, and do not have distinct meanings or roles by themselves. In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) is merely a term widely used for naming a controller configured to control a specific function of a vehicle, but does not mean a generic function unit. For example, each controller may include a communication device configured to communicate with a sensor or another control unit, a non-transitory memory configured to store an operation system, a logic command, or input/output information, and at least one processor configured to perform determination, calculation, decision or the like which are required for responsible function controlling.

FIG. 1 is a circuit diagram illustrating an example of a motor driving device according to an exemplary embodiment of the present disclosure.

Referring to FIG. 1, a motor driving device according to an exemplary embodiment of the present disclosure may include a main battery 50, a DC capacitor (or DC-Link capacitor) 60, a controller 70, and a motor system 100.

The motor system 100 may include dual inverters 10 and 20, a motor 30 having a plurality of coils C1, C2, and C3 respectively corresponding to a plurality of phases, and a mode switching unit 40.

The first inverter 10 may include a plurality of first switching elements S11, S12, S13, S14, S15 and S16 connected to one ends of the plurality of coils C1, C2, and C3, and the second inverter 20 may include a plurality of second switching elements S21, S22, S23, S24, S25 and S26 connected to the opposite ends of the plurality of coils C1, C2, and C3. The mode switching unit 40 may include a plurality of transfer switches S31, S32, and S33. The controller 70 may control on/off states of the plurality of first switching elements S11 to S16, the plurality of second switching elements S21 to S26, and the transfer switches S31, S32, and S33 based on an output required for the motor 30 (i.e., torque command for the motor 30), DC terminal voltages of the inverters 10 and 20 (i.e., the voltage of the main battery 50), the phase current of the motor 30, and the motor angle.

The first inverter 10 may include a plurality of legs 11, 12, and 13 to which a DC voltage formed in the DC capacitor 60 connected between both ends of the main battery 50 is applied. The legs 11, 12, and 13 may respectively correspond to a plurality of phases of the motor 30 to form electrical connections. More specifically, the first leg 11 may include two switching elements S11 and S12 connected in series to each other between both ends of the DC capacitor 60, and a connection node of the two switching elements S11 and S12 may be connected to one end of the coil C1 in one phase in the motor 30 such that AC power corresponding to one of the plurality of phases is input and output therethrough. Similarly, the second leg 12 may include two switching elements S13 and S14 connected in series to each other between both ends of the DC capacitor 60, and a connection node of the two switching elements S13 and S14 may be connected to one end of the coil C2 in one phase in the motor 30 such that AC power corresponding to one of the plurality of phases is input and output therethrough. In addition, the third leg 13 may include two switching elements S15 and S16 connected in series to each other between both ends of the DC capacitor 60, and a connection node of the two switching elements S15 and S16 may be connected to one end of the coil C3 in one phase in the motor 30 such that AC power corresponding to one of the plurality of phases is input and output therethrough.

The second inverter 20 may include a plurality of legs 21, 22, and 23 to which a DC voltage formed in the DC capacitor 60 connected between both ends of the main battery 50 is applied. The legs 21, 22, and 23 may respectively correspond to a plurality of phases of the motor 30 to form electrical connections. More specifically, the first leg 21 may include two switching elements S21 and S22 connected in series to each other between both ends of the DC capacitor 60, and a connection node of the two switching elements S21 and S22 may be connected to the opposite end of the coil C1 in one phase in the motor 30 such that AC power corresponding to one of the plurality of phases is input and output therethrough. Similarly, the second leg 22 may include two switching elements S23 and S24 connected in series to each other between both ends of the DC capacitor 60, and a connection node of the two switching elements S23 and S24 may be connected to the opposite end of the coil C2 in one phase in the motor 30 such that AC power corresponding to one of the plurality of phases is input and output therethrough. In addition, the third leg 23 may include two switching elements S25 and S26 connected in series to each other between both ends of the DC capacitor 60, and a connection node of the two switching elements S25 and S26 may be connected to the opposite end of the coil C3 in one phase in the motor 30 such that AC power corresponding to one of the plurality of phases is input and output therethrough.

One ends of the plurality of transfer switches S31, S32, and S33 may be respectively connected to different opposite ends of the plurality of coils C1, C2, and C3, and the opposite ends thereof may be interconnected at an internal node N. The plurality of transfer switches S31, S32, and S33 may employ various switching means, such as MOSFET, IGBT, thyristors, relays, or the like.

Although not shown in FIG. 1, the motor driving device may further include a so-called Y-capacitor (Y-Cap) in which two capacitors connected in series to each other are connected between a positive (+) DC terminal and a negative (−) DC terminal and a connection node between the capacitors is grounded.

The controller 70 may perform pulse width modulation control for switching the first switching elements S11 to S16 and the second switching elements S21 to S26 based on an output required by the motor 30, thereby driving the motor 30. The controller 70 may switch the dual inverters 10 and according to the motor driving mode, thereby controlling the driving of the motor 30, and control on/off states of the transfer switches S31, S32, and S33 for switching between a CEW mode and an OEW mode included in the motor driving mode. In this case, a first driving mode may be referred to as a "closed end winding (CEW) mode", and a second driving mode may be referred to as an "open end winding (OEW) mode". More specifically, when the CEW mode is performed, the controller 70 may turn on the transfer switches S31, S32, and S33 such that a neutral point of the motor 30 is formed at the internal node N, and control driving of the motor 30 through the first inverter 10 among the first and second inverters 10 and 20. On the other hand, when the OEW mode is performed, the controller 70 may turn off the transfer switches S31, S32, and S33 such that a neutral point of the motor 30 is not formed at the internal node N, and control driving of the motor 30 through the first and second inverters 10 and 20.

Figure 2:
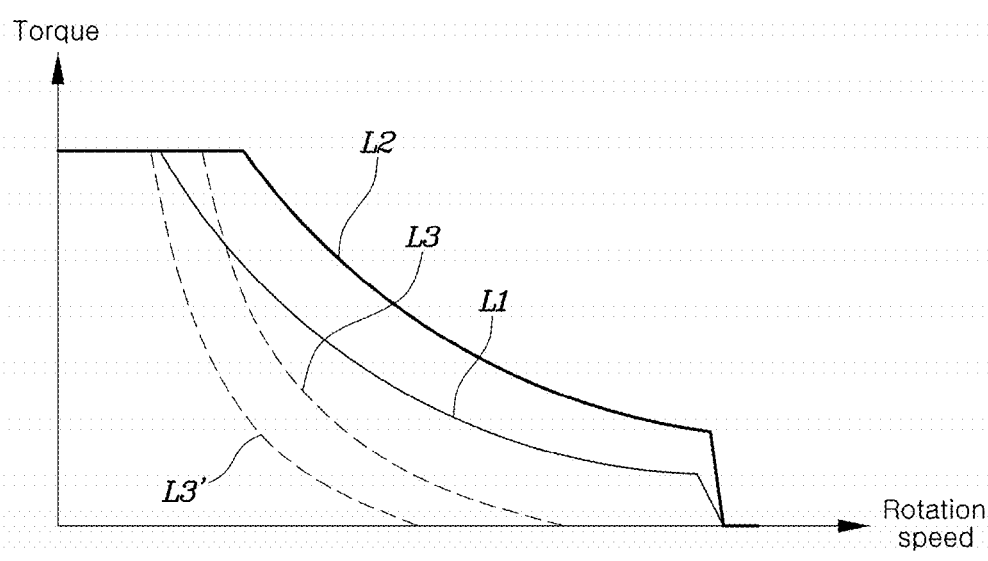
FIG. 2 is a diagram illustrating switching of a motor driving mode according to an exemplary embodiment of the present disclosure.

FIG. 2 is a diagram illustrating switching of a motor driving mode according to an exemplary embodiment of the present disclosure.

Referring to FIG. 2, an operating point map of a motor showing an output limit curve L1 in a CEW mode, an output limit curve L2 in an OEW mode, and a mode switching reference line L3 based on an efficiency map is shown.

The output limit curves L1 and L2 may represent output torque limit values of a motor depending on rotational speed (e.g., RPM) of the motor in respective motor driving modes. The output limit curve L2 has an output limit greater than that of the output limit curve L1 in at least some of the RPM range, and the output limit curves L1 and L2 may be configured in consideration of durability, heat generation, and current controllability of the motor and inverter.

The mode switching reference line L3 based on an efficiency map (not shown) may correspond to a boundary line between a high efficiency region in the CEW mode and a high efficiency region in the OEW mode. The efficiency map may include information about a mode with higher efficiency among the CEW mode and the OEW mode in the respective combinations of torque and reverse magnetic flux of the motor, and may have a table form depending on the implementation thereof. For example, the efficiency map may be derived based on results of measuring, through a test, the loss of the motor depending on the rotational speed and torque of the motor in each motor driving mode for each DC terminal voltage of the inverter. In this case, the reverse magnetic flux of the motor may be inversely proportional to the DC terminal voltage of the inverter (that is, the voltage of a battery) and proportional to the speed of the motor.

According to an exemplary embodiment, the mode switching reference line L3 may have a shape such as L3' according to the specifications of a motor driving device. However, the mode switching reference lines L3 and L3' are shown in FIG. 2 by way of example and are not necessarily limited thereto.

In order to switch the motor driving mode according to the mode switching reference line L3, the controller 70 may bilaterally switch the CEW mode and the OEW mode depending on a torque command value of the motor and a reverse magnetic flux value thereof with reference to the efficiency map. In this case, the reverse magnetic flux value may be calculated based on a torque command for the motor, a DC terminal voltage of the inverter, and a required speed of the motor. According to an exemplary embodiment, the controller 70 may correct the mode switching reference line in consideration of output limit, hysteresis or the like for the motor driving mode and, in this case, switch the motor driving mode depending on the torque command value for the motor and the reverse magnetic flux value thereof based on the corrected mode switching reference line.

Hereinafter, a description will be made to an electrified vehicle that forms a boost charging path connected from an auxiliary battery to a main battery through a motor system when a charging mode while driving is performed to boost the voltage of the auxiliary battery while driving, thereby controlling the charging of the main battery. A structure for this is shown in FIG. 3.

Figure 3:
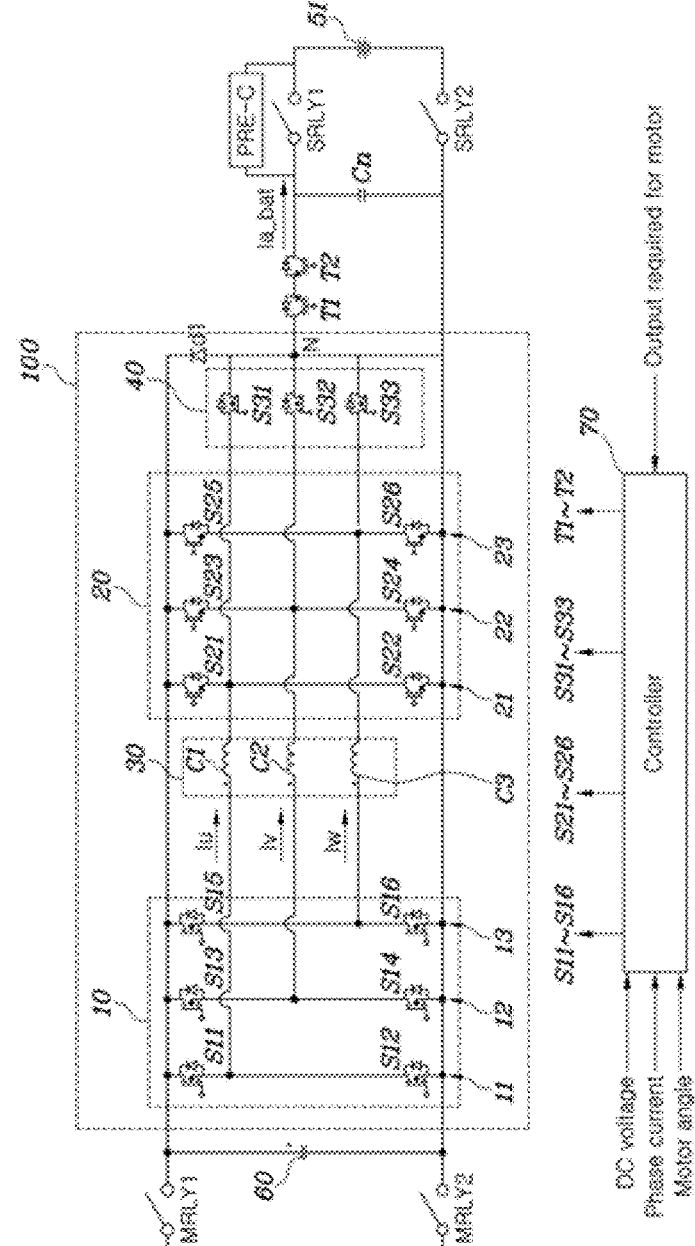
FIG. 3 is a circuit diagram of a motor driving device included in an electrified vehicle according to an exemplary embodiment of the present disclosure.

FIG. 3 is a circuit diagram of a motor driving device included in an electrified vehicle according to an exemplary embodiment of the present disclosure.

Referring to FIG. 3, a motor driving device according to an exemplary embodiment of the present disclosure may include a main battery 50, an auxiliary battery 51, a DC capacitor 60, a controller 70, a motor system 100, charging switches T1 and T2, a DC capacitor Cn, main relays MRLY1 and MRLY2, sub-relays SRLY1 and SRLY2, and a pre-charging circuit PRE-C.

The motor system 100 may be electrically connected to the main battery 50 and may include dual inverters 10 and 20, a motor 30, a mode switching unit 40, and a diode d1. In this case, the diode d1 may have an anode connected to an internal node N and a cathode connected to the positive (+) DC terminal of the second inverter 20.

The main relay MRLY1 may be connected between the positive (+) pole of the main battery 50 and the positive (+) DC terminal of the first inverter 10, and the main relay MRLY2 may be connected between the negative (−) pole of the main battery 50 and the negative (−) DC terminal of the first inverter 10. The DC capacitor 60 may be connected between the positive (+) DC terminal and the negative (−) DC terminal of the first inverter 10 in order to reduce the ripple with respect to the current of the main battery 50.

The sub-relay SRLY1 may be connected between the positive (+) pole of the auxiliary battery 51 and the internal node N, and the sub-relay SRLY2 may be connected between the negative (−) pole of the auxiliary battery 51 and the negative (−) DC terminal of the second inverter 20. The DC capacitor Cn may be connected between the positive (+) pole and the negative (−) pole of the auxiliary battery 51 in order to reduce the ripple with respect to the current of the auxiliary battery 51. The pre-charging circuit PRE-C may be connected to the positive (+) pole of the auxiliary battery 51 and may be connected in parallel to the sub-relay SRLY1. Although the pre-charging circuit PRE-C may be implemented as a circuit in which a resistor and a relay are connected in parallel, it is not necessarily limited thereto.

The charging switches T1 and T2 may be connected in series between the internal node N of the motor system 100 and the positive (+) pole of the auxiliary battery 51. More specifically, a collector terminal of the charging switch T1 may be connected to the internal node N, and a collector terminal of the charging switch T2 may be connected to the positive (+) pole of the auxiliary battery 51 through the sub-relay SRLY1, and an emitter end of each of the charging switches T1 and T2 may be interconnected to form a common node. In this embodiment, although the charging switches T1 and T2 are implemented as insulated gate bipolar transistors (IGBTs), they may also be implemented as MOSFETs according to various exemplary embodiments of the present disclosure.

Hereinafter, an operation method in which the controller 70 controls execution of a motor driving mode including a CEW mode and an OEW mode, and a charging mode during driving will be described.

When the CEW mode is performed, the controller 70 may turn on the transfer switches S31, S32, and S33 such that a neutral point of the motor 30 is formed at the internal node N, turn off the charging switches T1 and T2 so as to cut off the boost charging path connected from the auxiliary battery 51 to the main battery 50 through the motor system 100, and perform control such that the motor 30 is to be driven through the first inverter 10 among the first and second inverters 10 and 20. When the OEW mode is performed, the controller 70 may turn off the transfer switches S31, S32, and S33 such that a neutral point of the motor 30 is not formed at the internal node N, turn off the charging switches T1 and T2 such that the boost charging path is cut off, and perform control such that the motor 30 is to be driven through the first and second inverters 10 and 20. The controller 70, when the CEW mode or OEW mode is performed, may perform space vector pulse width modulation (SVPWM) control without a DC offset for each of the phase currents Iu, Iv, and Iw of the motor 30. The controller 70 may set the zero-phase current command value for the DC offset to "0". Here, the SVPWM control may refer to a method of synthesizing a reference voltage vector with a zero-voltage vector using two effective voltage vectors adjacent to the reference voltage vector in a complex space.

The controller 70 may switch the CEW mode to the charging mode while driving based on a predetermined command for performing the charging mode. When the charging mode while driving is performed, the controller 70 may turn on the transfer switches S31, S32, and S33 such that a neutral point of the motor 30 is formed at the internal node N, turn on the charging switches T1 and T2 such that a boost charging path is formed to be connected from the auxiliary battery 51 to the main battery 50 through the motor system 100, and perform control such that the motor 30 is to be driven through the first inverter 10 among the first and second inverters 10 and 20. In addition, when the charging mode while driving is performed, the controller 70 may apply a DC offset to each of the phase currents Iu, Iv, and Iw of the motor 30 having a plurality of phases based on a charging current command for the auxiliary battery 51. More specifically, when the charging mode while driving is performed, the controller 70 may divide a charging current command value by the number of phases (e.g., 3) to generate a zero-phase current command for the DC offset, and output multiple switching signals for pulse width modulation control based on the zero-phase current command.

Figure 4:
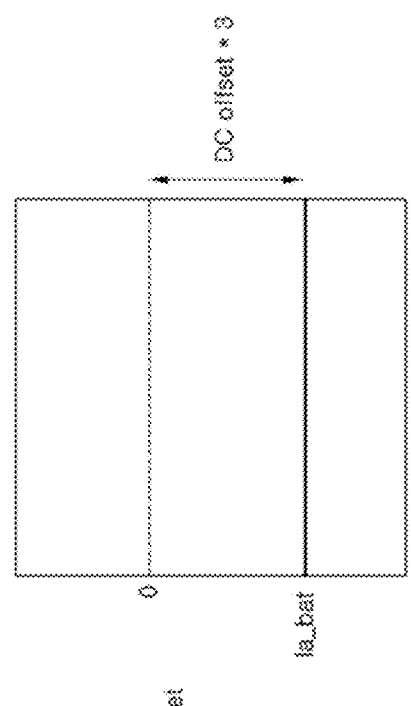
FIG. 4 is a waveform diagram of phase current of a motor and current of an auxiliary battery when a charging mode while driving is performed according to an exemplary embodiment of the present disclosure.

Referring to FIG. 4, an example of waveforms of phase currents Iu, Iv, and Iw of the motor 30 and charging current Ia_bat of the auxiliary battery 51 when the charging mode is performed during driving is illustrated. The respective phase currents Iu, Iv, and Iw of the motor 30 may have DC offsets and may have a phase difference of 120 degrees between each other. Since the charging current Ia_bat is equal to the sum of the phase currents Iu, Iv, and Iw of the motor 30, it may have a DC waveform obtained by multiplying the DC offset by the number of phases (e.g., 3). Therefore, when the controller 70 applies a negative (−) DC offset to each of the phase currents Iu, Iv, and Iw of the motor 30, the charging current Ia_bat may be output from the auxiliary battery 51 to the main battery 50 so that the motor system 100 may transfer the power of the auxiliary battery 51 to the main battery 50. On the other hand, when the controller 70 applies a positive (+) DC offset to each of the phase currents Iu, Iv, and Iw of the motor 30, the charging current Ia_bat may be output from the main battery 50 to the auxiliary battery 51 so that the motor system 100 may transfer the power of the main battery 50 to the auxiliary battery 51.

The controller 70, when the charging mode while driving is performed, may output a plurality of switching signals Su, Sv, and Sw to perform preconfigured pulse width modulation control for the first inverter 10 such that the motor system 100 boosts the voltage of the auxiliary battery 51 to charge the main battery 50, and control the DC offset for each of the phase currents Iu, Iv, and Iw of the motor 30. In this case, the plurality of switching signals Su, Sv, and Sw may correspond to the first leg 11, the second leg 12, and the third leg 13, respectively. In this embodiment, the preconfigured pulse width modulation control may be configured as one of either space vector pulse width modulation (SVPWM) control or remote state pulse width modulation (RSPWM) control. Here, the RSPWM control may refer to a method of synthesizing a reference voltage vector using three effective voltage vectors having a phase difference of 120 degrees from each other in a complex space.

Figure 5:
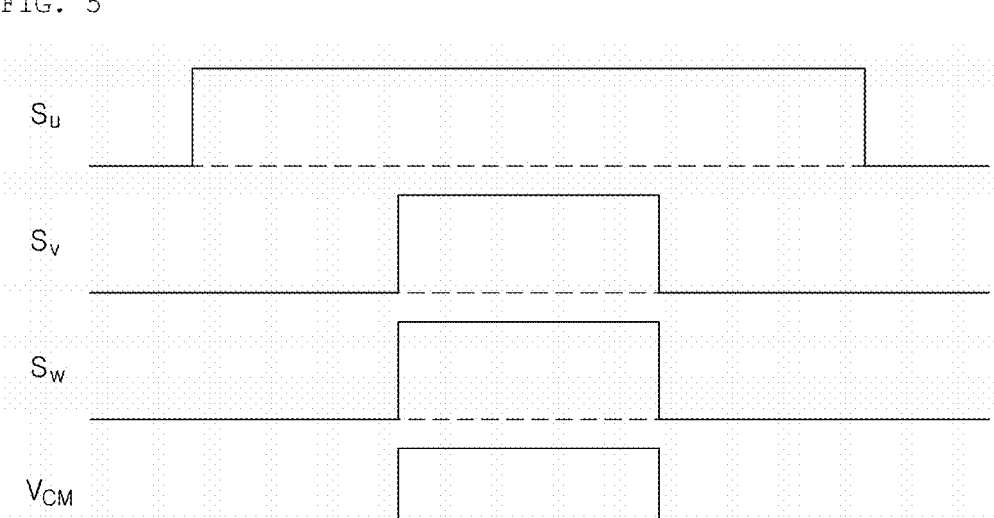
FIGS. 5 and 6 are waveform diagrams illustrating an operation in which a controller controls a switching state of an inverter in a charging mode while driving according to an exemplary embodiment of the present disclosure.

Referring to FIG. 5, an example of waveforms of a plurality of switching signals Su, Sv, and Sw and a common mode voltage $V_{CM}$ when the controller 70 performs SVPWM control is illustrated. In this case, the respective switching signals Su, Sv, and Sw may have center-aligned waveforms within one duty cycle. The maximum amplitude of the common mode voltage $V_{CM}$ may correspond to the voltage of the main battery 50 when the SVPWM control is performed. Here, the common mode voltage $V_{CM}$ may correspond to a potential difference between the ground terminal and the neutral point of the motor 30.

Figure 6:
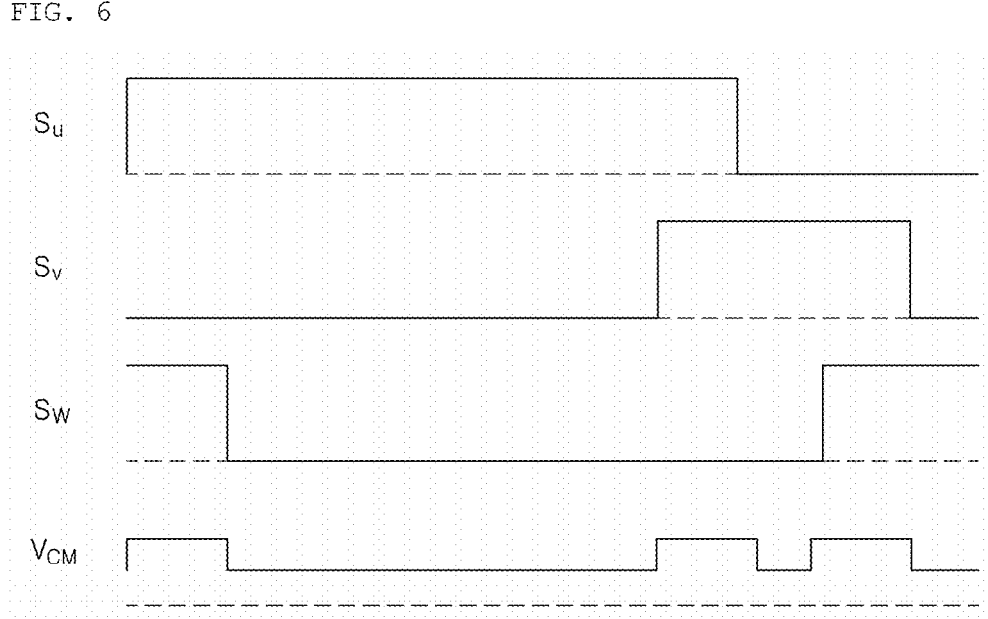

Referring to FIG. 6, an example of waveforms of a plurality of switching signals Su, Sv, and Sw and a common mode voltage $V_{CM}$ when the controller 70 performs RSPWM control is illustrated. The maximum amplitude of the common mode voltage $V_{CM}$ may correspond to a value obtained by dividing the voltage of the main battery 50 by 3 when the RSPWM control is performed. That is, since the RSPWM control method in FIG. 6 generates less pulsation of the common mode voltage $V_{CM}$ than the SVPWM control method in FIG. 5, the controller 70 may reduce a current ripple generated at the neutral point of the motor 30 through the RSPWM control in the charging mode while driving.

Hereinafter, an operation method for controlling the motor system 100 when the controller 70 switches between the CEW mode and the charging mode while driving will be described with reference back to FIG. 3.

When the CEW mode switches to the charging mode while driving, the controller 70 may pre-charge the DC capacitor Cn connected between the positive (+) pole and the negative (−) pole of the auxiliary battery 51 through the pre-charging circuit PRE-C connected to the auxiliary battery 51. After pre-charging the DC capacitor Cn, the controller 70 may switch each of the plurality of legs 11, 12, and 13 so as to configure the neutral point voltage (i.e., common mode voltage) of the motor 30 as the voltage of the auxiliary battery 51. At this time, the controller 70 may switch the pulse width modulation control method from the SVPWM control method to a preconfigured pulse width modulation control (e.g., RSPWM) method. Thereafter, the controller 70 may turn on the charging switches T1 and T2 in a turn-off state and may apply a DC offset to each of the phase currents Iu, Iv, and Iw of the motor 30 according to a charging current command value for the auxiliary battery 51.

When the charging mode switches to the CEW mode while driving, the controller 70 may configure the zero-phase current command value for the DC offset as "0" and then switch each of the plurality of legs 11, 12, and 13, thereby maintaining the neutral point voltage of the motor 30. At this time, the controller 70 may turn off the charging switches T1 and T2 in the turn-on state. When the charging switches T1 and T2 are turned off, the controller 70 may switch each of the plurality of legs 11, 12, and 13 through SVPWM control.

Figure 7:
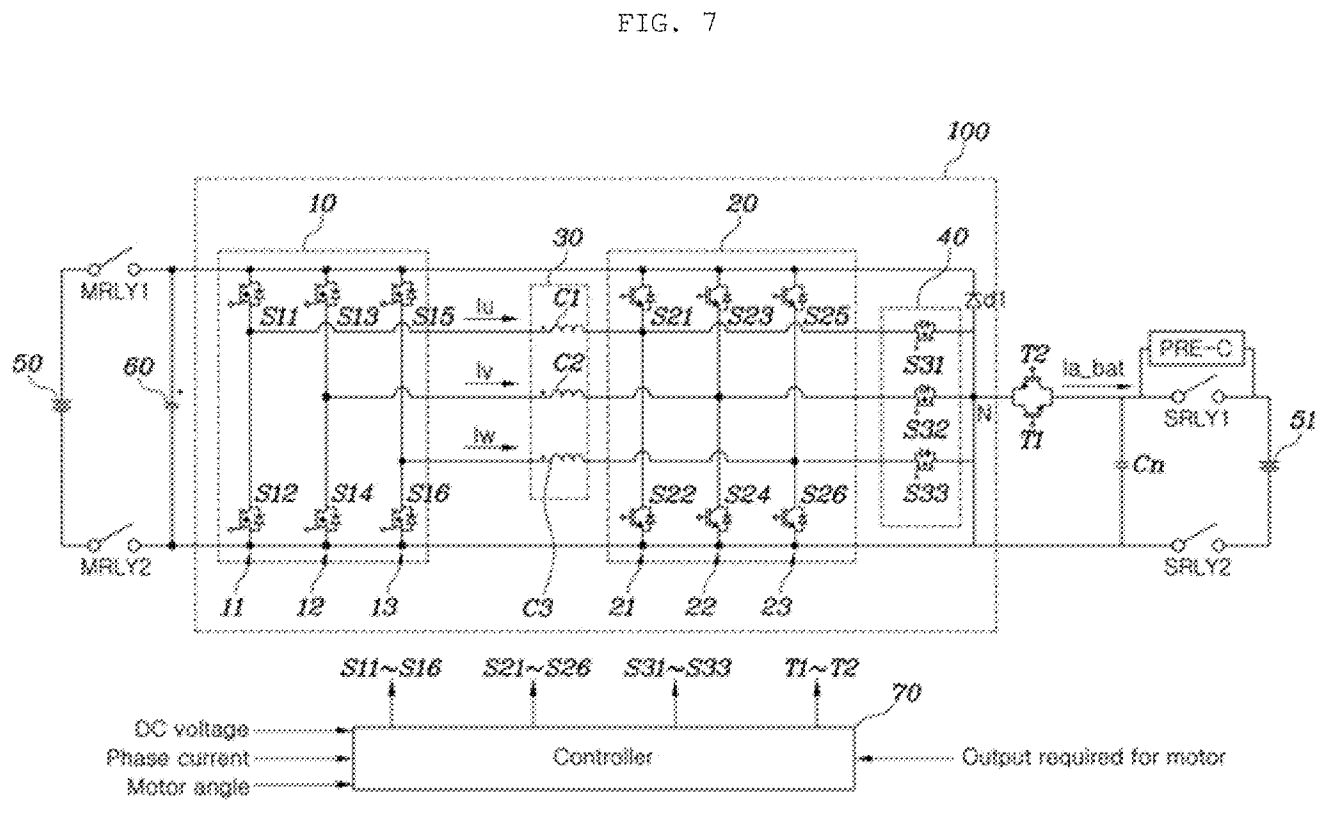

FIG. 7 is a circuit diagram illustrating the configuration of a motor driving system included in an electrified vehicle according to another exemplary embodiment of the present disclosure.

Referring to FIG. 7, a charging switch T1 and a charging switch T2 may be connected in parallel between an internal node N and the positive (+) pole of an auxiliary battery 51. More specifically, the collector terminal of the charging switch T1 and the emitter terminal of the charging switch T2 may be connected to the internal node N, and the emitter terminal of the charging switch T1 and the collector terminal of the charging switch T2 may be connected to the positive (+) pole of the auxiliary battery 51 through the sub-relay SRLY1. In the connection form shown in FIG. 7, when the charging switches T1 and T2 are turned on, only one of the charging switches T1 and T2 is in a conduction state depending on the current direction of the internal node N, so the conduction loss of the charging switches T1 and T2 may be minimized. In this case, the charging switches T1 and T2 may be implemented as transistors (e.g., IGBTs) having no reverse conduction characteristics.

Figure 8:
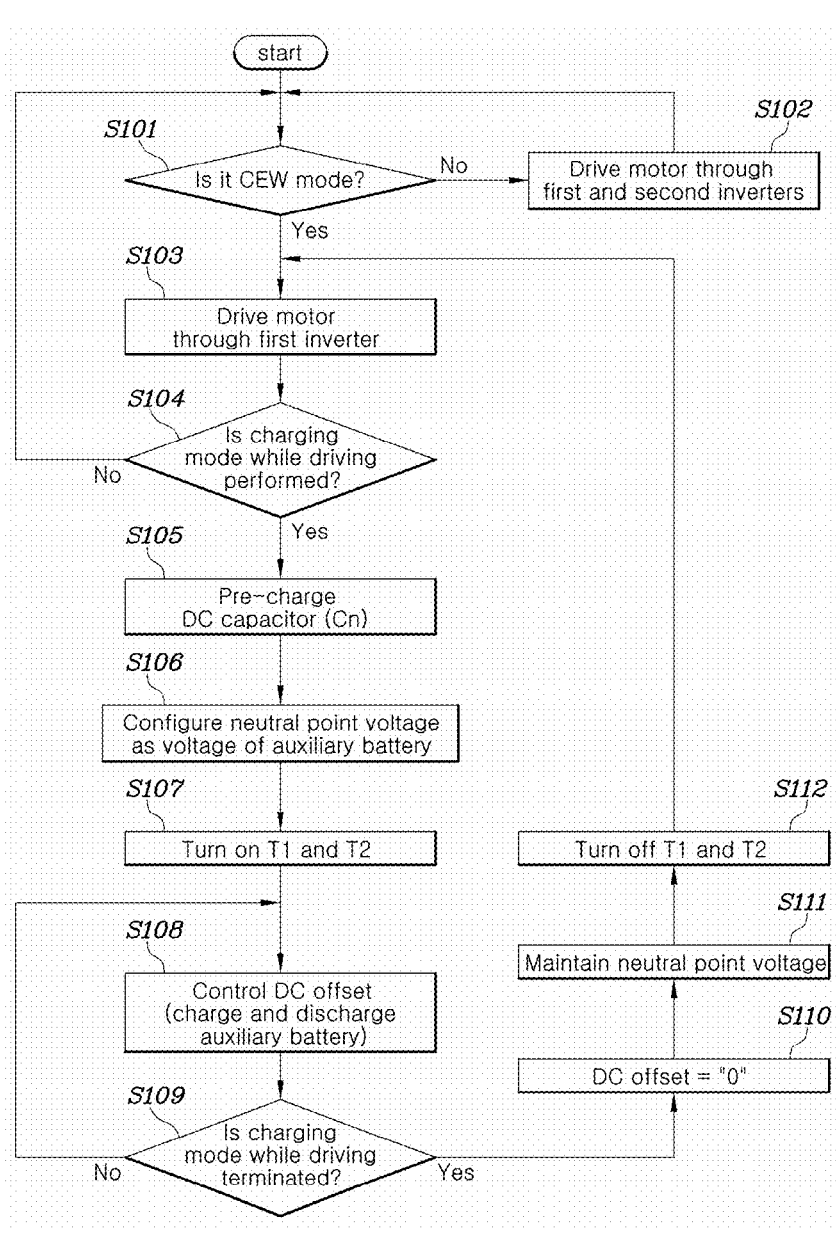
FIG. 8 is a flowchart illustrating a control method of an electrified vehicle according to an exemplary embodiment of the present disclosure.

FIG. 8 is a flowchart illustrating a control method of an electrified vehicle according to an exemplary embodiment of the present disclosure.

Referring to FIG. 8, the controller 70 may determine whether or not a CEW mode is performed (S101).

When the OEW mode is performed ("NO" in S101), the controller 70 may perform control such that the motor system 100 operates the motor 30 through the first and second inverters 10 and 20 based on the voltage of the main battery 50 (S102). At this time, the controller 70 may turn off the transfer switches S31, S32, and S33 such that a neutral point of the motor 30 is not formed at the internal node N and turn off the charging switches T1 and T2 so as to cut off the boost charging path connected from the auxiliary battery 51 to the main battery 50 through the motor system 100.

When the CEW mode is performed ("YES" in S101), the controller 70 may control the motor system 100 to drive the motor 30 through the first inverter 10 among the first and second inverters 10 and 20 based on the voltage of the main battery 50 (S103). At this time, the controller 70 may turn on the transfer switches S31, S32, and S33 such that a neutral point of the motor 30 is formed at the internal node N and turn off the charging switches T1 and T2 so as to cut off the boost charging path. Here, a zero-phase current command for the DC offset may be configured as "0".

Thereafter, the controller 70 may determine whether or not a charging mode while driving is performed (S104). When the charging mode while driving is not performed ("NO" in S104), S101 may be re-performed.

When the charging mode while driving is performed in the state in which the motor 30 is driven through the first inverter 10 ("YES" in S104), the controller 70 may sequentially perform S105, S106, and S107 to switch the CEW mode to the charging mode while driving. More specifically, the controller 70 may pre-charge the DC capacitor Cn connected between the positive (+) pole and the negative (−) pole of the auxiliary battery 51 through the pre-charging circuit PRE-C connected to the auxiliary battery 51 (S105). After pre-charging the DC capacitor Cn, the controller 70 may switch each of the plurality of legs 11, 12, and 13 to configure the neutral point voltage of the motor 30 as the voltage of the auxiliary battery 51 (S106). Thereafter, the controller 70 may turn on the charging switches T1 and T2 so as to form a boost charging path connected from the auxiliary battery 51 to the main battery 50 through the motor system 100 (S107).

When the charging mode while driving is performed, the controller 70 may perform preconfigured pulse width modulation control for the first inverter 10 to control a DC offset for each phase current of the motor 30 having a plurality of phases (S108). More specifically, the controller 70 may divide a charging current command value for the auxiliary battery 51 by the number of phases to generate a zero-phase current command for the DC offset, and perform preconfigured pulse width modulation control (e.g., SVPWM control or RSPWM control) based on the zero-phase current command, thereby switching each of the plurality of legs 11, 12, and 13. Accordingly, the motor system 100 may charge the main battery 50 by discharging the auxiliary battery 51 when the DC offset is negative (−), and charge the auxiliary battery 51 by discharging the main battery 50 when the DC offset is positive (+).

Thereafter, the controller 70 may determine whether or not the charging mode while driving is terminated (S109). When the charging mode while driving is not terminated ("NO" in S109), S108 may be re-performed.

When the charging mode while driving is terminated ("YES" in S109), the controller 70 may sequentially perform S110, S111, and S112, thereby switching the charging mode while driving to the CEW mode. More specifically, the controller 70 may configure the zero-phase current command value for the DC offset as "0" (S110). Thereafter, the controller 70 may switch each of the plurality of legs 11, 12, and 13 to maintain the neutral point voltage of the motor 30 (S111), and turned off the charging switches T1 and T2 to cut off the boost charging path connected from the auxiliary battery 51 to the main battery 50 through the motor system 100 (S112). Thereafter, S103 may be performed again.

Figure 9:
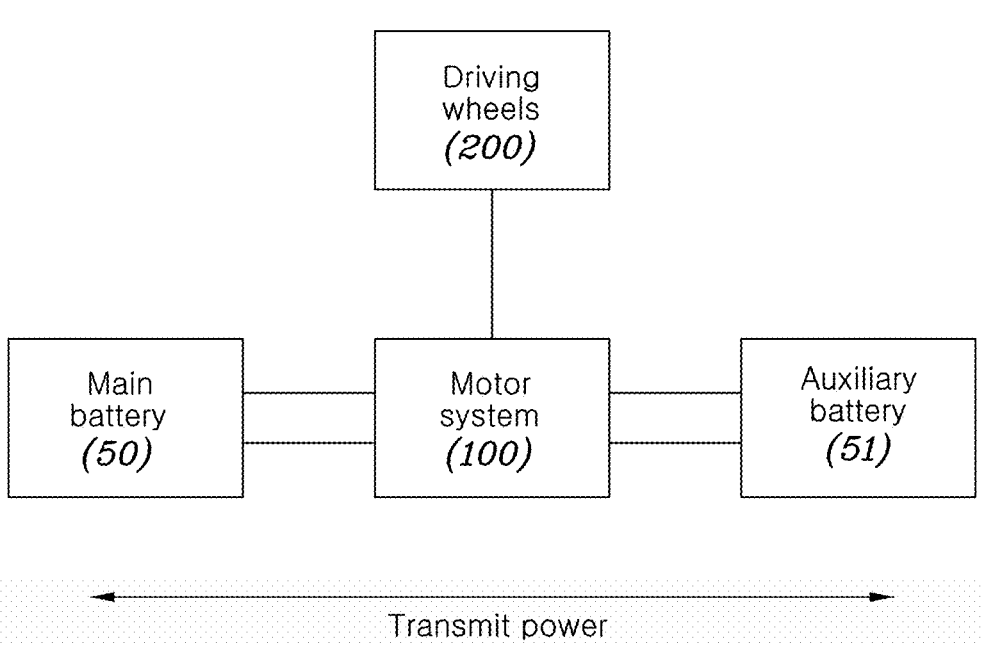
FIGS. 9 and 10 are block diagrams illustrating an example of a motor driving system to which the present disclosure is applied.
Figure 10:
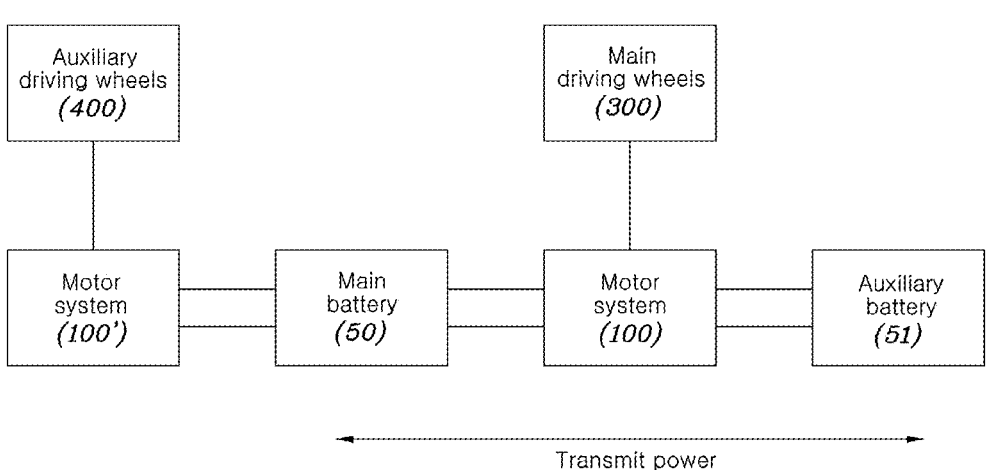

FIGS. 9 and 10 are block diagrams illustrating an example of a motor driving system to which the present disclosure is applied.

Referring to FIG. 9, the motor system 100 according to the present embodiment may transmit power to driving wheels 200 (e.g., rear wheels) provided in a two-wheel drive electrified vehicle based on the voltage of the main battery 50 in a motor driving mode. At this time, the motor system 100 may control power transmission between the main battery 50 and the auxiliary battery 51 while transmitting power to the driving wheels 200 in a charging mode while driving.

Referring to FIG. 10, the motor system 100 according to the present embodiment may be applied to a four-wheel drive electrified vehicle having main driving wheels 300 (e.g., rear wheels) and auxiliary driving wheels 400 (e.g., front wheels). The four-wheel drive electrified vehicle, based on the voltage of the main battery 50, may always transmit power to the main driving wheels 300 through the motor system 100 while driving and selectively transmit power to the auxiliary driving wheels 400 through a motor system 100' depending on whether or not four-wheel driving is executed while driving. In this case, the motor system 100 may control power transmission between the main battery 50 and the auxiliary battery 51 while transmitting power to the main driving wheels 300 in the charging mode while driving.

What is claimed is:

1. An electrified vehicle comprising:
a main battery and an auxiliary battery;
a motor system comprising a dual inverter connected to the main battery and driving a motor depending on a motor driving mode, and a transfer switch for switching between first and second driving modes included in the motor driving mode; and a charging switch connected between the motor system and the auxiliary battery, and configured to form a boost charging path connected from the auxiliary battery to the main battery through the motor system in a charging mode while driving,
wherein in the charging mode while driving, the boost charging path from the auxiliary battery to the main battery is formed through a neutral point of the motor formed in the first driving mode.

2. The electrified vehicle of claim 1, wherein the dual inverter comprises:
a first inverter connected to the main battery and connected to one ends of a plurality of coils included in the motor; and
a second inverter connected to the main battery and connected to the opposite ends of the plurality of coils,
wherein the transfer switch has one end connected to any one of the opposite ends of the plurality of coils and another end connected to an internal node, and
wherein the charging switch is connected between the internal node and one pole of the auxiliary battery.

3. The electrified vehicle of claim 2, wherein, in the first driving mode, the transfer switch is turned on, the charging switch is turned off such that the boost charging path is cut off, and the motor is driven through the first inverter among the first and second inverters, and
wherein, in the second driving mode, the transfer switch is turned off, the charging switch is turned off such that the boost charging path is cut off, and the motor is driven through the first and second inverters.

4. The electrified vehicle of claim 2, wherein, in the charging mode while driving, the transfer switch is turned on, the charging switch is turned on such that the boost charging path is formed, and the motor is driven through the first inverter among the first and second inverters.

5. The electrified vehicle of claim 4, further comprising a controller configured to perform preconfigured pulse width modulation control for the first inverter when the charging mode while driving is performed,
wherein the preconfigured pulse width modulation control is configured as any one of space vector pulse width modulation control and remote state pulse width modulation control.

6. The electrified vehicle of claim 1, wherein when the charging mode while driving is performed, a DC offset is applied to a phase current of the motor.

7. The electrified vehicle of claim 1, further comprising a controller configured to pre-charge a DC capacitor connected between one pole and the other pole of the auxiliary battery through a pre-charging circuit connected to the auxiliary battery when the first driving mode switches to the charging mode while driving.

8. The electrified vehicle of claim 7, wherein the controller is configured to configure a neutral point voltage of the motor as the voltage of the auxiliary battery after precharging the DC capacitor and turn on the charging switch in a turn-off state when the first driving mode switches to the charging mode while driving.

9. The electrified vehicle of claim 1, further comprising a controller configured to maintain a neutral point voltage of the motor and turn off the charging switch in a turn-on state when the charging mode while driving switches to the first driving mode.

10. An electrified vehicle comprising:
a main battery and an auxiliary battery;
a motor system configured to drive a motor through an inverter connected to the main battery; and

13 a controller configured to perform, when a charging mode while driving is performed, a preconfigured pulse width modulation control on the inverter to control a DC offset for a phase current of the motor such that the motor system boosts the voltage of the auxiliary battery to charge the main battery, wherein in the charging mode while driving, a boost charging path from the auxiliary battery to the main battery is formed through a neutral point of the motor.

11. The electrified vehicle of claim 10, wherein the preconfigured pulse width modulation control is configured as any one of space vector pulse width modulation control and remote state pulse width modulation control.

12. The electrified vehicle of claim 10, wherein the inverter comprises:

a first inverter connected to the main battery and connected to one ends of a plurality of coils included in the motor; and a second inverter connected to the main battery and connected to the opposite ends of the plurality of coils, wherein the motor system further comprises a plurality of transfer switches having one ends connected to the different opposite ends of the plurality of coils and the other ends connected to each other at an internal node.

13. The electrified vehicle of claim 12, further comprising a charging switch connected between the internal node and one pole of the auxiliary battery, and configured to form a boost charging path connected from the auxiliary battery to the main battery through the motor system when the charging mode while driving is performed.

14. The electrified vehicle of claim 13, wherein the controller is configured to control turn-on states of the plurality of transfer switches depending on a motor driving mode, and wherein the motor driving mode comprises:

a first driving mode in which the plurality of transfer switches is turned on, the charging switch is turned off such that the boost charging path is cut off, and the motor is driven through the first inverter among the first and second inverters; and a second driving mode in which the plurality of transfer switch is turned off, the charging switch is turned off such that the boost charging path is cut off, and the motor is driven through the first and second inverters.

15. The electrified vehicle of claim 14, wherein the controller is configured to pre-charge a DC capacitor connected between one pole and the other pole of the auxiliary battery through a pre-charging circuit connected to the auxiliary battery when the first driving mode switches to the charging mode while driving.

16. The electrified vehicle of claim 15, wherein the controller is configured to configure a neutral point voltage of the motor as the voltage of the auxiliary battery after pre-charging the DC capacitor and turn on the charging switch in a turn-off state when the first driving mode switches to the charging mode while driving.

17. The electrified vehicle of claim 14, wherein the controller is configured to maintain a neutral point voltage of the motor and turn off the charging switch in a turn-on state when the charging mode while driving switches to the first driving mode.

18. The electrified vehicle of claim 13, wherein, in the charging mode while driving, the plurality of transfer switches is turned on, the charging switch is turned on such that the boost charging path is formed, and the motor is driven through the first inverter among the first and second inverters.

19. A method of controlling an electrified vehicle, the method comprising:

driving a motor through an inverter based on a voltage of a main battery in a motor system; and forming a boost charging path connected from an auxiliary battery to the main battery through the motor system when a charging mode while driving is performed in a state in which the motor is driven, wherein in the charging mode while driving, the boost charging path from the auxiliary battery to the main battery is formed through a neutral point of the motor.

20. The method of claim 19, further comprising performing a preconfigured pulse width modulation control on the inverter when the charging mode while driving is performed to control a DC offset for a phase current of the motor.

* * * * *